Oct. 16, 1956  P. L. KOOIMAN ET AL  2,766,620
CALORIMETER FOR MEASURING THE AMOUNT OF HEAT
GIVEN OUT OR ABSORBED BY A FLOWING MEDIUM
Filed May 18, 1953  3 Sheets-Sheet 1
FIG:1
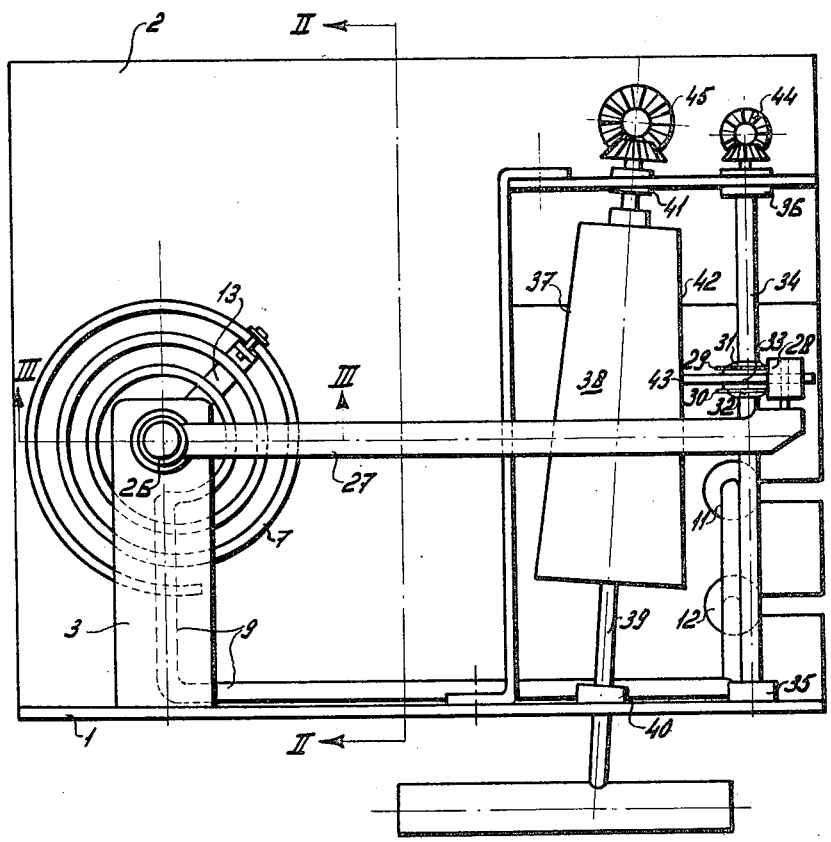
INVENTORS
PIETER L. KOOIMAN
and JOHANNES
BY DIRK de GRAAFF
ATTORNEY

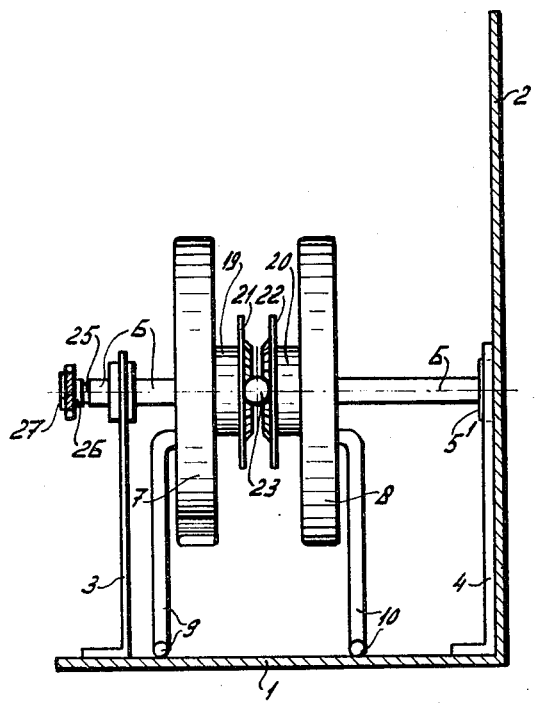
FIG:2

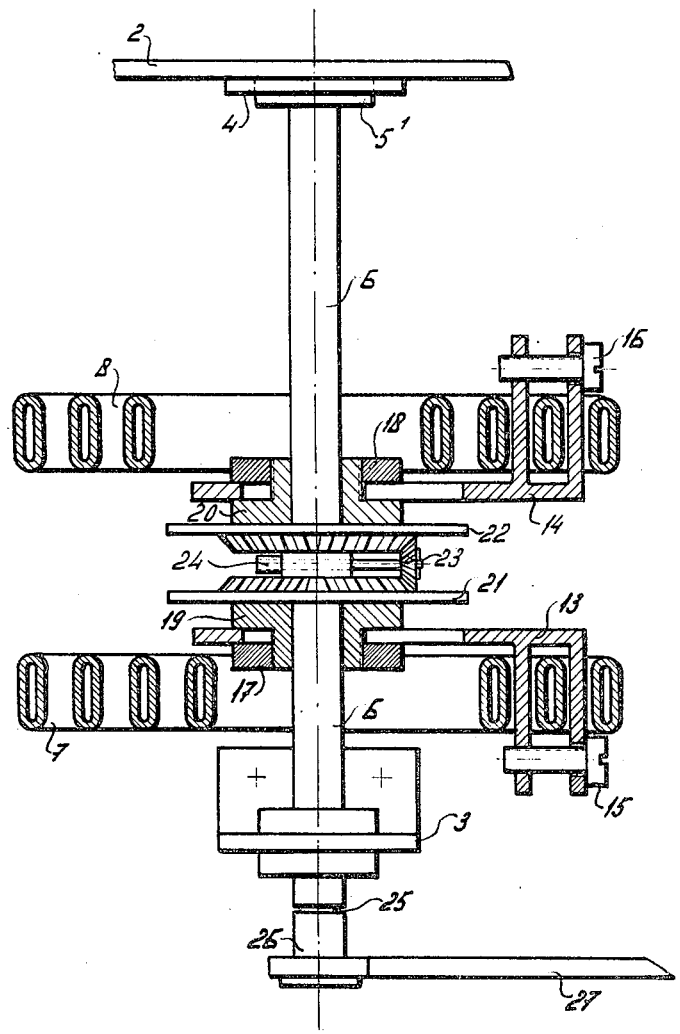

United States Patent Office 2,766,620
Patented Oct. 16, 1956

2,766,620

CALORIMETER FOR MEASURING THE AMOUNT OF HEAT GIVEN OUT OR ABSORBED BY A FLOWING MEDIUM

Pieter Leendert Kooiman and Johannes Dirk de Graaff, Dordrecht, Netherlands, assignors to Handelmaatschappij "Avedko" C. V., Dordrecht, Netherlands, a company of the Netherlands Application May 18, 1953, Serial No. 355,625

Claims priority, application Netherlands May 20, 1952

2 Claims. (Cl. 73—193)

This invention relates to calorimeters of the type for measuring the amount of heat given out or absorbed by a flowing medium, said calorimeters being provided with a flow meter and two Bourdon spring thermometers, with the deflections of these devices being transferred to a counting mechanism.

In known calorimeters of this type, the movements of the spiral of each Bourdon spring thermometer due to the occurrence of fluctuations of temperature are separately transferred to separate and not directly coupled lever arms. By means of the interposition of a relatively complicated lever system the deflections of the Bourdon spring thermometers are transferred ultimately to a counting mechanism. The friction and the play in the several couplings between the levers affect the accurate action of this kind of apparatus in a detrimental manner. In this case it is of no importance whether the arms connected to the Bourdon spring thermometers are joined to the freely movable outer extremities of the spirals or to the inner extremities of the tubes at the centers of the spirals.

The object of the present invention is to eliminate these drawbacks. According to the invention the spiral Bourdon spring thermometers are arranged side by side at substantially the same level and in parallel positions, while by means of a coupling rod directed to the center of each corresponding spiral spring, the outer extremities of the oppositely directed spiral springs of said thermometers are radially slidably connected to separate corresponding crown wheels of a differential gear assembly, both said crown wheels being rotatably mounted on a shaft which in turn is rotatably mounted in the frame of the calorimeter and has its axis almost coinciding with the centerlines passing through the centers of said spirals of the Bourdon spring thermometers, while further by means of a pin on which the pinion of said differential gear assembly is rotatably mounted, said pinion is fixed to said shaft.

Another object of the invention is to enable the exact adjustment of the apparatus and the sensitivity thereof by employing a part of the spiral winding lying farther from or nearer to the center of said spiral and according to the invention this can be done by constructing the coupling rods directed to the centers of the corresponding spiral springs in such a manner as to provide at their inner ends coupling parts which slidably and rotatably engage the shaft. However, each of said coupling parts also is adapted to be clamped at any selected position with respect to the corresponding crown wheel, while the outer ends of said rods are provided with forks adapted to be clamped to the spiral springs of the corresponding Bourdon spring thermometers so that after the coupling parts are released with respect to the corresponding crown wheel the fork of each coupling rod during its rotation in one direction or the other is free to follow the path of its corresponding spiral spring.

Furthermore the transfer to the counting mechanism of the deflections of the Bourdon spring thermometers may be realized by fixing the end of a one-armed lever to the shaft to which the pinion is also connected, and the end of said lever arm remote from said shaft is provided with a gripping device which co-operates with a part of the apparatus adapted to transfer the deflections of the Bourdon spring thermometers to a counting mechanism.

Still another object of the invention is to provide for the registration of the resultant deflection of both Bourdon spring thermometers added to the motion of the flow meter and according to the invention the gripping device at the end of the lever cooperates with a disk-like shaped part which is slidable along a rotatable guide rod, while the outer jacket of a body of revolution is rotatably arranged in the meter frame and driven by the flow meter of the calorimeter to continuously contact and drive said disk-like part. Exact registration may be further promoted by erecting vertically both the guide rod for the disk-like part as well as the outer jacket of the driving body of revolution at the tangent to the contact thereof with said disk-like part, while the body of revolution is shaped in such a manner that during displacing of the disk-like part the number of revolutions thereof is continuously changed in such proportions as to cause the exact transfer of the deflections of the various measuring devices of the calorimeter to the counting mechanism.

The accompanying drawings illustrate diagrammatically an example of an embodiment of the apparatus according to the invention.

Fig. 1 is an elevational view of those parts of the calorimeter necessary for an understanding of the invention, the frame of the meter being only partly represented.

Fig. 2 is a sectional view taken along the line II—II in Fig. 1, for simplicity's sake the coupling rods between each spiral and the corresponding crown wheel having been omitted.

Fig. 3 is a sectional view on a large scale taken along the line III—III in Fig. 1.

As seen in Figs. 1 and 2 on the bottom plate 1 and against the side plate 2 of the frame of the meter are arranged two bearing frames 3 and 4, with a continuous shaft 6 being mounted in bearings 5 and 5' on said bearing frames. Bourdon spring thermometers 7 and 8 are erected vertically side by side, the spirals being aligned in opposite direction and connected at their respective centers to the inlets 9, 10, which through related inlet openings 11, 12, pass into the inside of the meter frame and run along the bottom plate 1 to the places of erection of the thermometers.

By using coupling rods 13, 14 (see Fig. 3) which are rotatable round the continuous shaft 6 and slidable radially with respect to said shaft, the spiral spring of each Bourdon spring thermometer can be fixed at will at every point on a corresponding crown wheel 21, 22, each of said crown wheels being rotatable about said continuous shaft 6. By using the clamping screws 15, 16, the coupling rods can be clamped to the spirals, while by use of the nuts 17, 18 said coupling rods can also be clamped on annular joining pieces 19, 20 (see Fig. 2) forming part of the crown wheels 21, 22.

The crown wheels 21 and 22 forming parts of a differential gear assembly are arranged inside and between the spirals of the Bourdon spring thermometers 7 and 8, the third completing part of said gear being formed by the pinion 23 which engages the rims of the crown wheels 21 and 22. By means of a pin 24 the pinion 23 is immovably connected to the continuous shaft 6, whilst with the aid of a locking bush 26 one end of a lever 27 is connected to the extremity 25 of said shaft 6.

The action of these parts of the calorimeter is as follows. Once the calorimeter is installed in a particular plant the output of which has to be measured, and the coupling rods 13 and 14 having been adjusted, then in the case of temperatures remaining constant there will be a state of equilibrium and the whole system will be at rest. However, as soon as a fluctuation of the temperature occurs in one of the Bourdon spring thermometers, then the influence of said fluctuation will change the position of the spiral of said thermometer. With the aid of the corresponding coupling rod the movement of said spiral will be transferred to the corresponding crown wheel being rotatably arranged about the continuous shaft 6. Now said crown wheel will be rotated until a fresh state of equilibrium is attained, this time said state being adapted to the higher or lower temperature in said Bourdon spring thermometer due to the change. The rotation of said crown wheel drives the pinion in a clockwise direction or counter-clockwise depending on the sense of rotation of the moving crown wheel. By means of the pin 24 of the pinion also the continuous shaft 6 will be driven in such rotating motion as to cause ultimately the lever 27 to move upwards or downwards.

When fluctuations of the temperature occur in both Bourdon spring thermometers, then as a matter of course the magnitude as well as the direction of the resulting rotation of the pinion will depend on the simultaneous rotating motions of both crown wheels. Said rotating motions may be cumulative in their influences on the rotation of the pinion, but also they may be antagonistic or even the one motion may neutralize the other one, all this consequently corresponding to the extent of the changes of the increasing or decreasing temperature in each Bourdon spring thermometer.

The end of the lever 27 remote from the extremity 25 of the shaft 6 is provided with a gripping device 28, the two forks 29 and 30 of said device being arranged in a suitable way to contact respectively the upper part 31 and the lower part 32 of the body of a disk-like part 33. This disk-like part 33 slides freely along the guide rod 34 and by the influence of a pressure of the gripping device 28 on the lower part 32 or the upper part 31 of the body of said disk-like part 33, the latter moves along said guide rod 34.

The disk-like part 33 contacts the outer surface 37 of the jacket of a body of revolution having the shape of a frustum of a cone 38. Said frustum of a cone is mounted on an inclined axis 39 which is situated in the centerline of the body of revolution, while said axis 39 is rotatably mounted in the bearings 40 and 41 of the meter frame. The inclination of axis 39 has so been chosen as to erect vertically the generating line 42 in the point of contact 43 between thhe frustum of a cone 38 and the disk-like part 33.

The axis 39 of the frustum of a cone 38 is in a suitable manner coupled to the flow meter of the calorimeter not represented in the drawings. This flow meter gives said axis 39 a rotating motion with a velocity depending on the quantity of the medium, which per unit of time flows through the main pipe of the plant to be measured. Due to friction the frustum of cone 38 transfers its rotating motion to the disk-like part 33. As the gripping device 38 moves the disk-like part 33 sliding upwards and downwards along the guide rod 34, the number of revolutions of said disk-like part decreases or increases with regard to a constant speed of rotation, of the frustum of a cone 38. The higher or lower position of the disk-like part 33 depends on the position of the lever 27, whilst the motion of the pinion 23 being influenced by the occurring fluctuations of the temperature in one or both Bourdon spring thermometers 7 and 8 determined in turn the position of said lever. The transfer members 44 and 45 being arranged in a suitable manner will transfer the rotations of the shafts 34 and 39 respectively to a counting mechanism in the meter frame, which mechanism is not represented in the drawings.

Obviously various changes in the coupling means between the spirals and the differential gear, the arrangement of the lever as well as the shape of the disk-like part and the frustum of a cone may be applied without departing from the spirit of the invention and the scope of the appended claims.

What we claim is:

1. In a consumption meter for measuring the quantity of heat given up or absorbed by a flowing fluid and having a frame, a flow meter, a body driven by said flow meter, a counting mechanism driven by said body, and means operative to vary the driving speed of said counting mechanism at a given speed of said body; the combination of two Bourdon tube-thermometers having oppositely wound spirals supported at their inner ends and arranged in parallel planes; a single continuous shaft freely rotatably mounted in the meter frame at right angles to said planes and passing through the centers of said spirals; a differential gear assembly including two crown gears mounted on said shaft and freely rotatable relative to the latter at locations between said spirals, each of said crown gears having a hub integral therewith, a pinion meshing with both of said crown gears, a pin fixed to said shaft between said crown gears and extending at right angles to the shaft axis, said pinion being rotatably mounted on said pin, coupling rods connecting said crown gears to the spirals of the adjacent Bourdon tube-thermometers and each having a coupling part, at its inner end, in radially slidable engagement with said hub of the related crown gear; and a floating lever secured to said continuous shaft and controlling the means operative to vary the driving speed of the counting mechanism.

2. In a consumption meter, the combination as in claim 1; wherein each of said coupling rods has a forked part, at its outer end, in releasable clamping engagement with the spiral of the related thermometer.

References Cited in the file of this patent

UNITED STATES PATENTS

| 417,245 | Herschel | Dec. 17, 1889 |
| 832,611 | Junkers | Oct. 9, 1906 |
| 1,906,705 | Middleton et al. | May 2, 1933 |
| 2,667,783 | Mijnlieff et al. | Feb. 2, 1954 |

FOREIGN PATENTS

| 180,645 | Germany | Jan. 24, 1907 |
| 834,760 | Germany | Mar. 24, 1952 |
| 47,932 | Austria | May 26, 1911 |
| 689,428 | Great Britain | Mar. 25, 1953 |